(12) United States Patent
Kim et al.

(10) Patent No.: US 11,792,050 B2
(45) Date of Patent: Oct. 17, 2023

(54) METHOD AND APPARATUS FOR SIMULTANEOUS POWER ESTIMATION OF MULTIPLE SIGNAL SOURCES IN COMMUNICATION SYSTEM

(71) Applicant: ELECTRONICS AND TELECOMMUNICATIONS RESEARCH INSTITUTE, Daejeon (KR)

(72) Inventors: Chung Sup Kim, Daejeon (KR); Jun Seok Kim, Daejeon (KR); Jong Soo Lim, Daejeon (KR); Ju Yeon Hong, Daejeon (KR); Young Jun Chong, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 173 days.

(21) Appl. No.: 17/537,175

(22) Filed: Nov. 29, 2021

(65) Prior Publication Data

US 2023/0147708 A1 May 11, 2023

(30) Foreign Application Priority Data

Nov. 11, 2021 (KR) .................... 10-2021-0155121

(51) Int. Cl.
*H04L 25/02* (2006.01)
*H04B 17/30* (2015.01)
*H01Q 1/24* (2006.01)

(52) U.S. Cl.
CPC ......... *H04L 25/0248* (2013.01); *H01Q 1/242* (2013.01); *H04B 17/30* (2015.01)

(58) Field of Classification Search
CPC ..... H04L 25/0248; H04B 17/30; H01Q 1/242
See application file for complete search history.

(56) References Cited

U.S. PATENT DOCUMENTS

| 7,103,316 | B1 | 9/2006 | Hall |
| 8,938,200 | B2 | 1/2015 | Haykin |
| 10,419,133 | B2 | 9/2019 | Kim et al. |
| 2005/0276361 | A1 | 12/2005 | Kim et al. |
| 2019/0369204 | A1 | 12/2019 | Kim et al. |
| 2021/0124006 | A1 | 4/2021 | Sheng et al. |
| 2021/0239785 | A1 | 8/2021 | Suzaki et al. |

FOREIGN PATENT DOCUMENTS

KR 1020180001919 A 1/2018

*Primary Examiner* — Natasha W Cosme
(74) *Attorney, Agent, or Firm* — Rabin & Berdo, P.C.

(57) ABSTRACT

An operating method of a power estimation apparatus comprising a fixed antenna and a mobile antenna may comprise: a first operation of obtaining N measurement values by receiving a signal from signal sources using the fixed antenna and the mobile antenna that moves at a speed v from a first point to an Nth point; a second operation of generating a two-dimensional (2D) data collection set comprising N×M measurement values, by repeating the first operation M times; applying an approximation singular value decomposition (SVD) algorithm to the 2D data collection set; and obtaining information of the signal sources based on an application result of the approximation SVD algorithm, wherein N and M are natural numbers.

12 Claims, 4 Drawing Sheets

FIG. 4

$$\begin{bmatrix} D_{1,1} & \cdots & D_{1,N} \\ \vdots & \ddots & \vdots \\ D_{M,1} & \cdots & D_{M,N} \end{bmatrix} \xrightarrow{\text{APPLY APPROXIMATION -SVD ALGORITHM}} \begin{bmatrix} \lambda_{1,1} & \cdots & 0 \\ \vdots & \ddots & \vdots \\ 0 & \cdots & \lambda_{M,N} \end{bmatrix}$$

METHOD AND APPARATUS FOR SIMULTANEOUS POWER ESTIMATION OF MULTIPLE SIGNAL SOURCES IN COMMUNICATION SYSTEM

CROSS-REFERENCE TO RELATED APPLICATIONS

This application claims priority to Korean Patent Application No. 10-2021-0155121, filed on Nov. 11, 2021, with the Korean Intellectual Property Office (KIPO), the entire contents of which are hereby incorporated by reference.

BACKGROUND

1. Technical Field

The present invention relates to a simultaneous power estimation technique, and more particularly, to a technique for simultaneous power estimation for multiple signal sources by using a mobile antenna.

2. Related Art

When a communication system may accurately estimate a power value of signal sources existing at the same time in the same band, the communication system may perform efficient communication using various communication scheme technologies according to a signal-to-interference-plus-noise-ratio (SINR) of the signal sources. When multiple signal sources exist at the same time in the same band for simultaneous power value estimation, a mobile-antenna-based system uses a method of stopping a system operation and sequentially estimating the power of the signal sources in order to measure the power of interference sources other than the signal sources, thus being inefficient.

In addition, a multi-antenna-based system collects signals for respective antennas by using an array antenna structure having a number of antennas greater than the number of signal sources and then extracts diagonal matrix singular values using various signal processing methods such as singular value decomposition (SVD), etc., to simultaneously estimate power values. However, a fixed array antenna may have a problem of a complex structure and a high cost.

SUMMARY

The present invention is proposed to solve these problems and aims to provide a method and apparatus for simultaneous power estimation for signal sources existing in a band by using a mobile antenna in a communication system.

According to a first exemplary embodiment of the present disclosure, an operating method of a power estimation apparatus comprising a fixed antenna and a mobile antenna may comprise: a first operation of obtaining N measurement values by receiving a signal from signal sources using the fixed antenna and the mobile antenna that moves at a speed v from a first point to an Nth point; a second operation of generating a two-dimensional (2D) data collection set comprising N×M measurement values, by repeating the first operation M times; applying an approximation singular value decomposition (SVD) algorithm to the 2D data collection set; and obtaining information of the signal sources based on an application result of the approximation SVD algorithm, wherein N and M are natural numbers.

The fixed antenna and the mobile antenna may have a linear virtual array antenna structure, and the mobile antenna may move along the linear virtual array antenna structure.

The fixed antenna and the mobile antenna may have a circular virtual array antenna structure, and the mobile antenna may move along the circular virtual array antenna structure.

The application result of the approximation SVD algorithm may comprise a diagonal matrix, and the information of the signal sources may be obtained based on an interpretation result of the diagonal matrix.

The information of the signal sources may comprise at least one of power, number, or position the signal sources, or a number of multi-paths.

The approximation SVD algorithm may be used to compensate the speed v of the mobile antenna being lower than a symbol change rate of the signal sources.

According to a second exemplary embodiment of the present disclosure, a power estimation apparatus may comprise: a processor; a memory electronically communicating with the processor; a fixed antenna; a mobile antenna; and instructions stored in the memory, wherein the instructions, when executed by the processor, operate to cause the power estimation apparatus to: perform a first operation of obtaining N measurement values by receiving a signal from signal sources using the fixed antenna and the mobile antenna that moves at a speed v from a first point to an Nth point; perform a second operation of generating a two-dimensional (2D) data collection set comprising N×M measurement values, by repeating the first operation M times; apply an approximation singular value decomposition (SVD) algorithm to the 2D data collection set; and obtain information of the signal sources based on an application result of the approximation SVD algorithm, wherein N and M are natural numbers.

The fixed antenna and the mobile antenna may have a linear virtual array antenna structure, and the instructions may operate to cause the mobile antenna to move along the linear virtual array antenna structure.

The fixed antenna and the mobile antenna have a circular virtual array antenna structure, and the instructions operate to cause the mobile antenna to move along the circular virtual array antenna structure.

The application result of the approximation SVD algorithm may comprise a diagonal matrix, and the information of the signal sources may be obtained based on an interpretation result of the diagonal matrix.

The information of the signal sources may comprise at least one of power, number, or position the signal sources, or a number of multi-paths.

The approximation SVD algorithm may be used to compensate the speed v of the mobile antenna being lower than a symbol change rate of the signal sources.

According to the present invention, the power estimation apparatus may configure a virtual array antenna by moving a single antenna without using an array antenna, thereby reducing complexity and cost when compared to an array antenna structure using a plurality of antennas. Moreover, the power estimation apparatus may set the number of virtual array antennas and a signal measurement interval through the virtual aperture structure appropriately for a real environment, thereby improving resolution and accuracy. In this way, the performance of the communication system may be improved.

BRIEF DESCRIPTION OF DRAWINGS

FIG. 4 is a conceptual view showing a result of application of an approximation-singular value decomposition (SVD) algorithm.

DETAILED DESCRIPTION OF THE EMBODIMENTS

Figure 1:
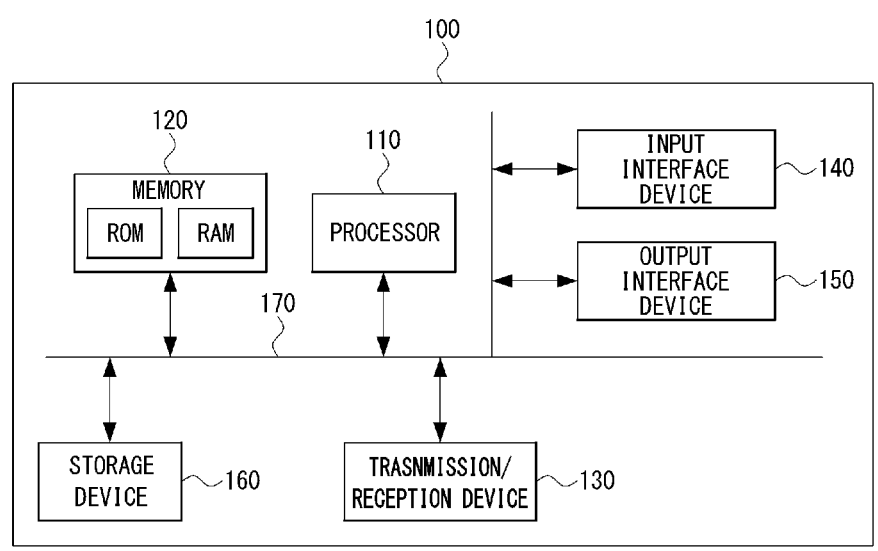
FIG. 1 is a block diagram showing an embodiment of a power estimation apparatus.

Embodiments of the present disclosure are disclosed herein. However, specific structural and functional details disclosed herein are merely representative for purposes of describing embodiments of the present disclosure. Thus, embodiments of the present disclosure may be embodied in many alternate forms and should not be construed as limited to embodiments of the present disclosure set forth herein.

Accordingly, while the present disclosure is capable of various modifications and alternative forms, specific embodiments thereof are shown by way of example in the drawings and will herein be described in detail. It should be understood, however, that there is no intent to limit the present disclosure to the particular forms disclosed, but on the contrary, the present disclosure is to cover all modifications, equivalents, and alternatives falling within the spirit and scope of the present disclosure. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

In exemplary embodiments of the present disclosure, 'at least one of A and B' may mean 'at least one of A or B' or 'at least one of combinations of one or more of A and B'. Also, in exemplary embodiments of the present disclosure, 'one or more of A and B' may mean 'one or more of A or B' or 'one or more of combinations of one or more of A and B'.

In exemplary embodiments of the present disclosure, '(re)transmission' may mean 'transmission', 'retransmission', or 'transmission and retransmission', '(re)configuration' may mean 'configuration', 'reconfiguration', or 'configuration and reconfiguration', '(re)connection' may mean 'connection', 'reconnection', or 'connection and reconnection', and '(re-)access' may mean 'access', 're-access', or 'access and re-access'.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular embodiments only and is not intended to be limiting of the present disclosure. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, exemplary embodiments of the present disclosure will be described in greater detail with reference to the accompanying drawings. In order to facilitate general understanding in describing the present disclosure, the same components in the drawings are denoted with the same reference signs, and repeated description thereof will be omitted.

A communication system to which exemplary embodiments according to the present disclosure are applied will be described. The communication system to which the exemplary embodiments according to the present disclosure are applied is not limited to the contents described below, and the exemplary embodiments according to the present disclosure may be applied to various communication systems. Here, the communication system may be used in the same sense as a communication network.

FIG. 1 is a block diagram showing an embodiment of a power estimation apparatus.

Referring to FIG. 1, a power estimation apparatus 100 may include at least one processor 110, a memory 120, and a transmission device/reception device 130 connected to a network to perform communication. In addition, the power estimation apparatus 100 may further include an input interface device 140, an output interface 150, a storage device 160, etc. Respective components included in the power estimation apparatus 100 may be connected by a bus 170 to perform communication with each other.

However, each component included in the power estimation apparatus 100 may be connected around the processor 110 through a separate interface or a separate bus rather than the common bus 170. For example, the processor 110 may be connected to at least one of the memory 120, the transmission/reception device 130, the input interface 140, the output interface 150, and the storage device 160 through a dedicated interface.

The processor 110 may execute a program command stored in at least one of the memory 120 and the storage device 160. The processor 110 may mean a central processing unit (CPU), a graphics processing unit (GPU), or a dedicated processor on which methods according to embodiments of the present invention are performed. Each of the memory 120 and the storage device 160 may be configured with at least one of a volatile storage medium and a non-volatile storage medium. For example, the memory 120 may include at least one of read-only memory (ROM) and random-access memory (RAM).

Next, a method for simultaneous power estimation for multiple signals using a mobile antenna will be described. A power estimation apparatus may form a virtual array antenna structure by moving one or more antennas. A size of a virtual aperture of the virtual array antenna may be set variously. For example, the size of the virtual aperture may be about $10\lambda$. Alternatively, the size of the virtual aperture may be less than $10\lambda$.

Figure 2A:
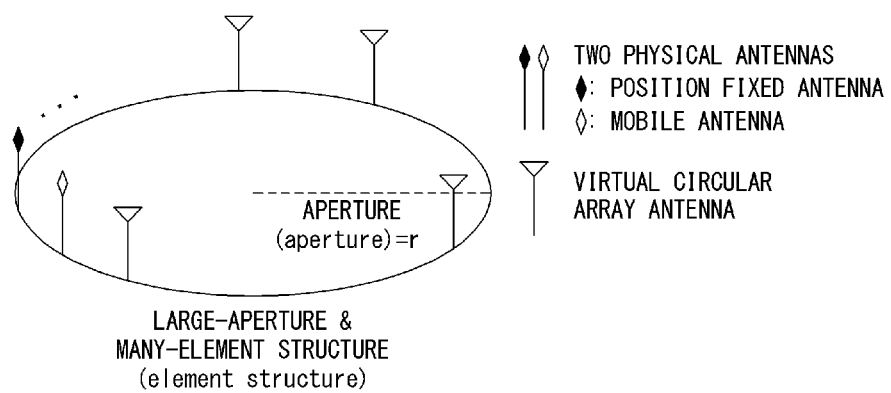
FIG. 2A is a conceptual view showing an embodiment of a virtual circular array antenna structure.

FIG. 2A is a conceptual view showing an embodiment of a virtual circular array antenna structure.

Referring to FIG. 2A, one antenna may be a fixed antenna as a reference antenna. Another antenna may move in a circle without being fixed in a specific position. A mobile antenna may collect data at a plurality of points by moving along a circular virtual array antenna structure at a constant speed.

Figure 2B:
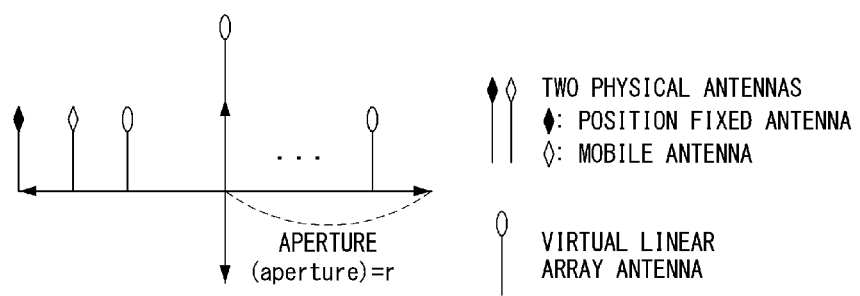
FIG. 2B is a conceptual view showing an embodiment of a virtual linear array antenna structure.

FIG. 2B is a conceptual view showing an embodiment of a virtual linear array antenna structure.

Referring to FIG. 2B, one antenna may be a fixed antenna as a reference antenna. Another antenna may move linearly without being fixed in a specific position. A mobile antenna may collect data at a plurality of points by moving along a linear virtual array antenna structure at a constant speed. The linear virtual array antenna structure may be a straight virtual array antenna structure. The linear virtual array antenna structure may be a cross virtual array antenna structure.

An existing array antenna may have a problem of a power estimation limitation (e.g., a case where the number of signal sources is greater than the number of antennas) of signal sources closely related to the number of antennas. However, a mobile-antenna-based power estimation apparatus may form a virtual array antenna structure through a software-based algorithm scheme, such that the number of virtual array antennas may increase for a large size of the aperture and a large number of measurement points. Thus, the mobile-antenna-based power estimation apparatus may extend the number of virtual array antennas without structural complexity, thereby allowing power estimation for multiple signal sources at the same time and improving resolution. Moreover, the mobile-antenna-based power estimation apparatus may reduce a cost incurred by the increase of the number of fixed antennas when compared to the use of the fixed array antenna.

[Generation of Two-Dimensional Data Collection Set]

Figure 3:
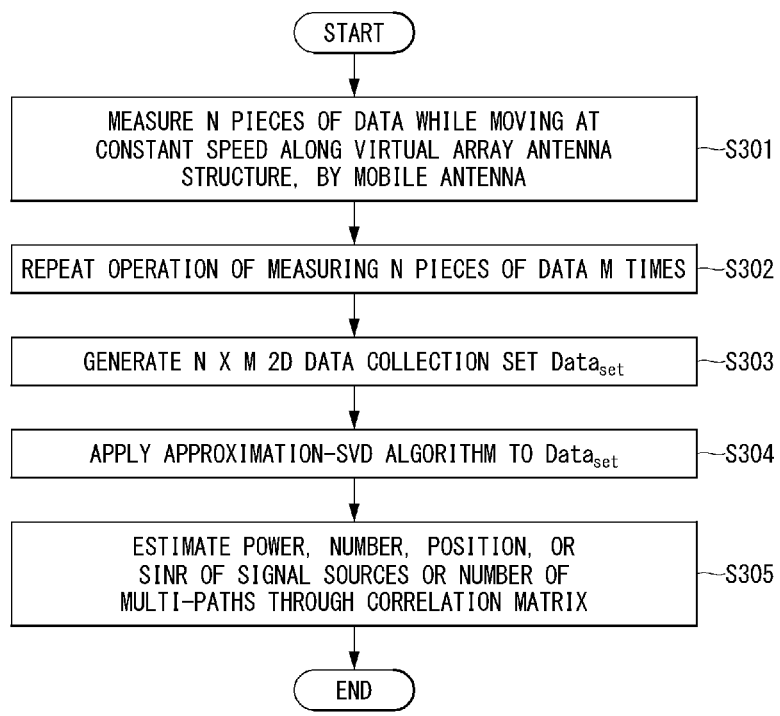
FIG. 3 is a flowchart showing a power estimation method of a power estimation apparatus.

FIG. 3 is a flowchart showing a power estimation method of a power estimation apparatus.

Referring to FIG. 3, the power estimation apparatus may generate a two-dimensional (2D) data collection set by using the virtual array antenna structure shown in FIG. 2A or 2B. That is, the power estimation apparatus may generate a 2D data collection set in the form of N (the number of virtual array antennas)×M (the number of repetitive measurements), based on data (e.g., a signal) collected by a mobile antenna at each point.

More specifically, the power estimation apparatus may move the mobile antenna at a speed v according to a virtual array antenna structure. The mobile antenna may measure N pieces of data while moving at the speed v. N may mean the number of virtual array antennas (e.g., the number of measurement positions). That is, the mobile antenna may move and measure data at N points (e.g., points having an interval of 0.5λ), in operation S301.

Equation 1 below may indicate a signal $(y_{t_1,d_1})$ received in an antenna for a distance $d=d_1$ between two antennas and a time $t=t_1$.

$$y_{t_1,d_1} = \begin{bmatrix} y_{1,t_1,d_1} \\ y_{2,t_1,d_1} \end{bmatrix} = \quad\quad [\text{Equation 1}]$$

$$[a_{d_1}(\theta_1) \ a_{d_1}(\theta_2) \ \ldots \ a_{d_1}(\theta_I)] \begin{bmatrix} s_{1,t_1,d_1} \\ s_{2,t_1,d_1} \\ \vdots \\ s_{I,t_1,d_1} \end{bmatrix} + \begin{bmatrix} n_{1,t_1,d_1} \\ n_{2,t_1,d_1} \end{bmatrix} =$$

$$A_{d_1} s_{t_1,d_1} + n_{t_1,d_1} \left( a_d(\theta) = \begin{bmatrix} 1 \\ e^{j\frac{2\pi d \sin\theta}{\lambda}} \end{bmatrix} \right),$$

I indicates the number of signal sources

Moreover, for the time $t=t_2$, for the distance $d=d_1$ between the two antennas during movement of the mobile antenna, a signal $(y_{t_2,d_1})$ received in the antenna may be expressed as below.

$$y_{t_2,d_1} = \begin{bmatrix} y_{1,t_2,d_1} \\ y_{2,t_2,d_1} \end{bmatrix} = \quad\quad [\text{Equation 2}]$$

$$[a_{d_1}(\theta_1) \ a_{d_1}(\theta_2) \ \ldots \ a_{d_1}(\theta_I)] \begin{bmatrix} s_{1,t_2,d_1} \\ s_{2,t_2,d_1} \\ \vdots \\ s_{I,t_2,d_1} \end{bmatrix} + \begin{bmatrix} n_{1,t_2,d_1} \\ n_{2,t_2,d_1} \end{bmatrix} =$$

$$A_{d_1} s_{t_2,d_1} + n_{t_2,d_1}$$

The power estimation apparatus may repeat operation S301 described above M times, in operation S302. That is, an operation of collecting, by the mobile antenna, data at N points while moving at the speed v along the virtual array antenna structure may be repeated until $t_M$. A set of data measured by the power estimation apparatus at the speed v from the first point to the last point of the virtual array may be defined as $Data_{set\_1}$, which may include $D_{1,1}, \ldots, D_{1,N}$. Thus, a set of measurement data generated by repeating, by the mobile antenna, an operation of measuring data at the N points at the speed v M times may be defined as $Data_{set\_1}, \ldots, Data_{set\_M}$, which may be expressed as a 2D data collection set like Equation 3 below, in operation S303.

$$Data_{set\_1}, \ldots, Data_{set\_M} = \begin{bmatrix} D_{1,1} & \ldots & D_{1,n} \\ \vdots & \ddots & \vdots \\ D_{M,1} & \ldots & D_{M,N} \end{bmatrix} \quad [\text{Equation 3}]$$

FIG. 4 is a conceptual view showing a result of application of an approximation-singular value decomposition (SVD) algorithm.

Referring to FIG. 4, by applying an approximation-SVD algorithm to a set $Data_{set\_1}, \ldots, Data_{set\_M}$ (e.g., a 2D data collection set in the form of N×M) of measurement data generated by repeating, by a mobile antenna, an operation of measuring data at N points at a constant speed (e.g., the speed v), a diagonal matrix may be generated in operation S304. A detailed application method of the approximation-SVD algorithm may be as below.

[Application of Approximation-SVD Algorithm to Two-Dimensional Data Collection Set]

The power estimation apparatus may overlap data measured at each position of a moving path. However, when a moving speed of the movable antenna is lower than a symbol change rate of an incident signal, it may be difficult for the power estimation apparatus to perform accurate power estimation due to a coherent feature change caused by a phase change of a signal source during power measurement. Thus, the power estimation apparatus may compensate for the inaccuracy of power estimation according to the moving speed of the mobile antenna through the approximation-SVD algorithm.

The power estimation apparatus may apply an approximation algorithm based on a zero uncorrelation term to obtain an effect similar to the case of using a fixed array antenna for Dataset measured at each point. For the distance $d=d_1$ between the two antennas, a correlation matrix expressing a received signal vector with a random vector $y_{d_1}$ may be expressed as below.

$$E\{y_{d_1} y_{d_1}^H\} = E\{(A_{d_1} s_{d_1} + n_{d_1})(A_{d_1} s_{d_1} + n_{d_1})^H\} = \quad \text{[Equation 4]}$$

$$A_{d_1} E\{s_{d_1} s_{d_1}^H\} A_{d_1}^H + E\{n_{d_1} n_{d_1}^H\} =$$

$$A_{d_1} \begin{bmatrix} E\{|s_1|^2\} & 0 & \cdots & 0 \\ 0 & E\{|s_2|^2\} & \cdots & 0 \\ \vdots & \vdots & \ddots & \vdots \\ 0 & 0 & \cdots & E\{|s_I|^2\} \end{bmatrix} A_{d_1}^H +$$

$$\begin{bmatrix} E\{|n_1|^2\} & 0 \\ 0 & E\{|n_2|^2\} \end{bmatrix}$$

$$= P_1 a_{d_1}(\theta_1) a_{d_1}(\theta_1)^H + P_2 a_{d_1}(\theta_2) a_{d_1}(\theta_2)^H + \cdots +$$

$$P_I a_{d_1}(\theta_I) a_{d_1}(\theta_I)^H + \begin{bmatrix} Q_1 & 0 \\ 0 & Q_2 \end{bmatrix} (P_1 = E\{|s_1|^2\}, P_2 = E\{|s_2|^2\},$$

$$\ldots, P_I = E\{|s_I|^2\}, Q_1 = E\{|n_1|^2\}, Q_2 = E\{|n_2|^2\})$$

The power estimation apparatus may calculate an approximate value of the correlation matrix $E\{y_{d_1}, y_{d_1}^H\}$ of Equation 4 from M already measured samples (e.g., signals received in antennas) by using Equation 5 below.

$$\tilde{E}\{y_{d_1} y_{d_1}^H\} = \frac{1}{M} (y_{t_1,d_1} y_{t_1,d_1}^H + y_{t_2,d_1} y_{t_2,d_1}^H + \cdots + y_{t_M,d_1} y_{t_M,d_1}^H) \quad \text{[Equation 5]}$$

[Power Estimation Method of Signal Source Based on Result of Application of Approximation-SVD Algorithm]

By applying the approximation-SVD algorithm (e.g., Equations 4 and 5) to the 2D data collection set of FIG. 4, a diagonal matrix may be generated. The power estimation apparatus may estimate the power and SINR of a signal source based on an application result (e.g., the diagonal matrix of FIG. 4) of the approximation-SVD algorithm. Moreover, for the distance between the two antennas, d= $d_2, \ldots, d_N$, as well as d=$d_1$, the power estimation apparatus may generate I correlation matrices based on a constant distance between two antennas through Equations 4 and 5. The power estimation apparatus may estimate parameters (e.g., power, azimuth, and altitude) using Equation 6 below, in operation S305.

$$\underset{P_1, P_2, \ldots, P_I, \theta_1, \theta_2, \ldots, \theta_I, Q_1, Q_2}{\text{argmin}} \quad \text{[Equation 6]}$$

$$\sum_{k=1}^{N} \left\| \tilde{E}\{y_{d_i} y_{d_i}^H\} - P_1 a_{d_i}(\theta_1) a_{d_i}(\theta_1)^H - P_2 a_{d_i}(\theta_2) a_{d_i}(\theta_2)^H \right.$$

$$\left. - \cdots - P_I a_{d_i}(\theta_I) a_{d_i}(\theta_I)^H - \begin{bmatrix} Q_1 & 0 \\ 0 & Q_2 \end{bmatrix} \right\|_F^2$$

A nonlinear estimation problem as in Equation 6 may be solved by a numerical method (e.g., gradient descent), and may be efficiently solved using an optimization algorithm (e.g., a convex optimization algorithm) when an objective function may be changed into the form of a convex function. In addition, a machine learning algorithm and libraries for nonlinear estimation may also be used.

When the power estimation apparatus may predict a noise variance, the accuracy of the estimation problem may be improved by substituting known values rather than parameters to be estimated for $Q_1$ and $Q_2$. The power estimation apparatus may perform position tracking as well as power estimation of a signal source at the same time/in the same band through Equation 6.

The zero uncorrelation term-based approximation algorithm may easily solve the problem by setting I when the number of incident signal sources is known. However, in a general real environment situation where the number of incident signal sources is unknown, the power estimation apparatus may expand the virtual aperture to set the number I of incident signal sources to be large, such that $P_i$ corresponding to an actual signal source may be derived as a large value and $P_i$ not corresponding to an actual signal source may be derived as a small value. Thus, the zero uncorrelation term-based approximation algorithm may be efficiently used in a real environment.

[Method for Estimating SINR for Multiple Signal Sources]

The power estimation apparatus may estimate the SINR for multiple signal sources existing in a measurement band after performing the approximate-SVD algorithm. After obtaining an average value of diagonal-matrix singular values generated by application of the SVD algorithm, the power estimation apparatus may estimate, as noise power, an average value of total diagonal matrix data of a period under two points (e.g., a point corresponding to a maximum approximate value point−2) in a position of the most similar value with the above-described average value among singular values of a diagonal matrix from an end point of the diagonal matrix.

The power estimation apparatus may generate a $\text{Data}_{set}$ correlation matrix to minimize a rank estimation error originating from multi-paths, and may determine an approximate value of values estimated from $\text{Data}_{set}$ to be nearly constant in the case of a small effect of the multi-paths based on $\text{Data}_{set}$. On the other hand, for a large effect of the multi-paths, the power estimation apparatus may determine that an approximate value differs with a length of the multi-paths in a virtual array antenna position for a multi-path signal source, thereby improving the accuracy of estimation of the number of signal sources existing in a band in a multi-path situation.

In other words, the power estimation apparatus may estimate the number of signal sources and the approximate number of multi-paths through the above-described determination method for singular values generated by applying the SVD algorithm to a correlation matrix generated by application of an approximation algorithm.

The exemplary embodiments of the present disclosure may be implemented as program instructions executable by a variety of computers and recorded on a computer readable medium. The computer readable medium may include a program instruction, a data file, a data structure, or a combination thereof. The program instructions recorded on the computer readable medium may be designed and configured specifically for the present disclosure or can be publicly known and available to those who are skilled in the field of computer software.

Examples of the computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device can be configured to operate as at least one software module in order to perform the embodiments of the present disclosure, and vice versa.

While the embodiments of the present disclosure and their advantages have been described in detail, it should be understood that various changes, substitutions and alterations may be made herein without departing from the scope of the present disclosure.

What is claimed is:

1. An operating method of a power estimation apparatus comprising a fixed antenna and a mobile antenna, the operating method comprising:
a first operation of obtaining N measurement values by receiving a signal from signal sources using the fixed antenna and the mobile antenna that moves at a speed v from a first point to an Nth point;
a second operation of generating a two-dimensional (2D) data collection set comprising N×M measurement values, by repeating the first operation M times;
applying an approximation singular value decomposition (SVD) algorithm to the 2D data collection set; and
obtaining information of the signal sources based on an application result of the approximation SVD algorithm,
wherein N and M are natural numbers.

2. The operating method of claim 1, wherein the fixed antenna and the mobile antenna have a linear virtual array antenna structure, and the mobile antenna moves along the linear virtual array antenna structure.

3. The operating method of claim 1, wherein the fixed antenna and the mobile antenna have a circular virtual array antenna structure, and the mobile antenna moves along the circular virtual array antenna structure.

4. The operating method of claim 1, wherein the application result of the approximation SVD algorithm comprises a diagonal matrix, and the information of the signal sources is obtained based on an interpretation result of the diagonal matrix.

5. The operating method of claim 1, wherein the information of the signal sources comprises at least one of power, number, or position the signal sources, or a number of multi-paths.

6. The operating method of claim 1, wherein the approximation SVD algorithm is used to compensate the speed v of the mobile antenna being lower than a symbol change rate of the signal sources.

7. A power estimation apparatus comprising:
a processor;
a memory electronically communicating with the processor;
a fixed antenna;
a mobile antenna; and
instructions stored in the memory,
wherein the instructions, when executed by the processor, operate to cause the power estimation apparatus to:
perform a first operation of obtaining N measurement values by receiving a signal from signal sources using the fixed antenna and the mobile antenna that moves at a speed v from a first point to an Nth point;
perform a second operation of generating a two-dimensional (2D) data collection set comprising N×M measurement values, by repeating the first operation M times;
apply an approximation singular value decomposition (SVD) algorithm to the 2D data collection set; and
obtain information of the signal sources based on an application result of the approximation SVD algorithm,
wherein N and M are natural numbers.

8. The power estimation apparatus of claim 7, wherein the fixed antenna and the mobile antenna have a linear virtual array antenna structure, and the instructions operate to cause the mobile antenna to move along the linear virtual array antenna structure.

9. The power estimation apparatus of claim 7, wherein the fixed antenna and the mobile antenna have a circular virtual array antenna structure, and the instructions operate to cause the mobile antenna to move along the circular virtual array antenna structure.

10. The power estimation apparatus of claim 7, wherein the application result of the approximation SVD algorithm comprises a diagonal matrix, and the information of the signal sources is obtained based on an interpretation result of the diagonal matrix.

11. The power estimation apparatus of claim 7, wherein the information of the signal sources comprises at least one of power, number, or position the signal sources, or a number of multi-paths.

12. The power estimation apparatus of claim 7, wherein the approximation SVD algorithm is used to compensate the speed v of the mobile antenna being lower than a symbol change rate of the signal sources.

* * * * *